UNITED STATES PATENT OFFICE.

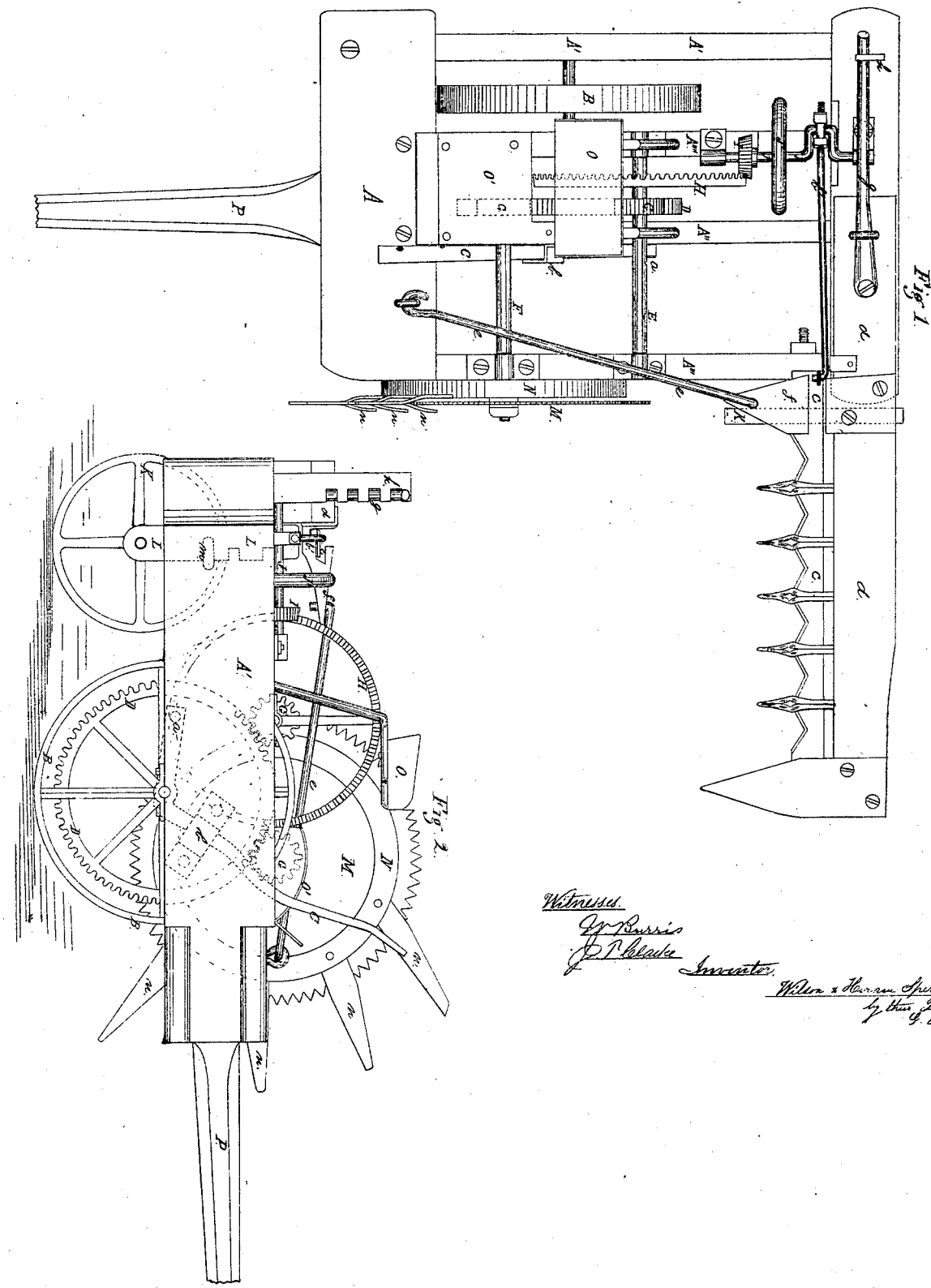

WILSON SPERRY AND HIRAM SPERRY, OF TRIVOLI, ILLINOIS.

IMPROVEMENT IN HEDGE-TRIMMERS.

Specification forming part of Letters Patent No. 57,590, dated August 28, 1866.

*To all whom it may concern:*

Be it known that we, WILSON SPERRY and HIRAM SPERRY, of Trivoli, Peoria county, and State of Illinois, have invented a new and useful Improvement in Hedge-Trimmers; and we do hereby declare the following to be a full, clear, and exact description of the construction and operation of the same, reference being had to the accompanying drawings, making a part of this specification, in which—

Figure 1 is a plan or top view of our improved hedge-trimming machine; Fig. 2, a side elevation of the same.

Like letters in both figures of the drawings indicate like parts.

The nature of our invention consists in the arrangement of a circular plate on the side of a frame provided with saw-teeth, having a number of finger-bars suitably arranged around the forward portion of the periphery of the plate; also, the arrangement of a knife-bar provided with finger-bars (such as is used in reaping and mowing machines) whereby, through the appliance and arrangement of a driving-wheel and suitable cog-gearing connecting therewith, a rotary motion is imparted to the circular tooth-plate, by which, in connection with the reciprocating motion given to the knife-bar from the same source, the side and top of the hedge are trimmed at the same time, the forward movement of the machine producing a combined operation of the knife-bar and circular tooth-plate, enabling the machine to trim the side of the hedge simultaneously with that of the top, and thereby expediting the trimming process.

Our invention has reference, further, to the arrangement of a lever on the beam to which the knife-bar is attached, and its connection with a vertical notched bar on the frame, for regulating the height of the knife-bar in proportion to the height of the hedge to be trimmed, and to the arrangement of another lever on the side of one of the beams of the frame connecting with the shaft of the driving-wheel, so that at any moment, if desired, the driver or operator in his seat may stop the knife-bar and circular tooth-plate in their operation by throwing the cog-gearing out of gear.

To enable others skilled in the art to make and use our invention, we will proceed to describe its construction and operation.

A represents a frame, constructed of the proper material and of a suitable size; B, the driving-wheel which propels the machine, and of a size sufficient to elevate the same and give the required movement to the cog-gearing for operating the knife-bar and circular tooth-plate.

The shaft of the driving-wheel extends from the outer beam, A', to an inner one, A''. The end of the shaft under the outer beam is secured thereto by a plate, bolts, and screw-nuts. The other end of the shaft projects under the inner beam, A'', and beyond it sufficiently to receive the foot-lever C, which is passed through the same and fastened thereto in a proper manner. This foot-lever and the peculiar form of its construction are seen more clearly in Fig. 2, a portion of which is in dotted lines. It is attached to the side of the inner beam by a pivot bolt or rod, *a*. A box-plate, *b*, is placed across the lever a little above the junction of it with the shaft, and secured to the side of the beam by bolts and screw-nuts, (see the same in dotted lines in Fig. 2,) which box serves as a guide and a limit to the latitude of the movement of the lever, the object of which lever will be explained more fully hereinafter.

On the shaft of the driving-wheel, and fastened thereto near the inner beam, A'', is a cog-wheel, D, of the proper size, having straight teeth. (See, more clearly, Fig. 2.) On the top of the outer beam, A''', and extending therefrom across the inner beam, A'', to and on another inner beam, A'''', is a shaft, E, the ends of which are secured to the beams by plates, bolts, and screw-nuts. Running parallel with this shaft, and near the forward part of the machine, is another one, F, secured in a like manner to the beams as the above one. These two shafts have two small cog-wheels, G G, fastened on them, and proportionate to the size of the larger wheel, into which they gear, (see Fig. 2,) one of which is in dotted lines and the other partly so.

The shaft first above mentioned, as will be observed, is continued across the inner beam, A'', onto the beam A'''', between the two beams of which is placed, and fastened to the shaft near the small wheel, a beveled cog-wheel, H, which cog-wheel gears into a smaller one, I, arranged on the end of the crank-shaft J. This one is made of a size proportionate to that of the larger one, which gears into it, and to the power required in operating the knife-bar.

The ends of the crank-shaft are secured on the top of the rear transverse beam and beam A'''' connecting therewith by plates, bolts, and screw-nuts. The beam for supporting the crank-shaft as well as the one running parallel with it are both joined in the most substantial manner to the front and rear transverse beams, and of such construction as will sustain the weight of the operating parts bearing thereon in a durable manner.

In the crank part of the shaft a rod, $b'$, is suitably connected therewith at one end, which rod connects with its other end to the knife-bar $c$, which bar and finger-bars appertaining thereto are the same that is and are used in reaping and mowing machines.

The knife-bar and finger-bars are attached to a beam, $d$, which beam is hinged onto the top of the rear transverse one about midway of the same. This beam $d$ is made steady by a brace-rod, $e$, one end of which is fastened to the front transverse beam and the other to a pointed finger-plate, $f$, connecting with the beam by screw bolts and nuts. In and through this plate the knife-bar works. (See Fig. 2.)

The beam $d$ has a lever, $g$, arranged obliquely and secured on the top of it near the point of its connection with the rear transverse beam by the hinge. On the same beam, and attached thereto near the end, is a vertical notched bar, $h$. (See Fig. 2.)

If the operator or driver wishes to elevate or depress the knife-bar to suit the height of the hedge to be trimmed, it is done by taking hold of the end of the lever just described and placing it into one of the notches of the vertical bar, where it is held fast until removed.

The rear part of the machine, near the corner under the knife-bar and beam, is supported by a wheel, K, to assist in the movement and transportation of the machine, which wheel has a small rigid shaft fitting in such a manner into the lower part of the vertical notched bar L as will admit of an easy revolution therein. This wheel, by means of the vertical bar thus connecting therewith, may be made to elevate or depress this end of the machine, according to the requirements of the occasion in the trimming of the hedge, by a pin or other suitable contrivance, $m$, placed in one of the notches of the bar and through a hole in the side of the beam on which the bar is arranged, where the same is held fast until the pin is removed. This adjustable arrangement of the wheel and of the knife-bar above will be found to meet almost any contingency that may happen from the irregular surfaces of the ground that the machine may have to traverse and the varying heights of the hedges corresponding therewith.

On the end of the forward shaft F is the circular plate M, provided with sharp saw-teeth, and made rigid thereto in a suitable manner.

A circular bar, N, is attached to the side of the beam immediately in the rear of the plate. Around the periphery of the forward portion of the circular bar, arranged and secured thereto in a proper manner, are finger-bars $n$. These bars, in their action upon the side of the hedge, operate the same in relation to the circular cutting-plate as the finger-bars do to that of the knife-bar in reaping and mowing machines.

O is the driver's or operator's seat, supported by two suitable bars attached to the two inner beams; O', the foot-stand; P, the tongue.

In the description of the crank-shaft herein referred to mention was not made of the balance-wheel J' thereon. The purpose for which it is placed there being well known, we will not describe the same particularly, other than the mere mentioning of it.

Additional gearing may be added to increase the speed of the knife-bar and circular saw. The attachment of a spur-wheel on the beveled wheel and saw-shaft will accomplish this result.

Operation: The machine is placed alongside of a hedge with the circular saw in contact with the irregular projecting edges of the hedge and the knife-bar adjusted over the hedge and in contact with the irregular projecting heights of the same. The driver starts the machine forward on the driving-wheel, the shaft of which, revolving, carries the large cog-wheel thereon around, which communicates motion to the two smaller cog-wheels gearing into the same above, the motion imparted to the one on the forward shaft revolving the circular saw at the end thereon, the other on the rear shaft revolving the large beveled cog-wheel, which, gearing into the smaller one on the crank-shaft, imparts a reciprocating motion to the knife-bar, the two knives thus operating simultaneously as the machine is propelled forward, the driver occasionally adjusting the knife-bar by the lever on the notched-bar, which lever elevates or depresses the same, according to the height of the hedge. If he desires it, by placing his foot on the foot-lever in front to the left of him and pressing it forward or down, the large cog-wheel on the shaft of the driving-wheel, which shaft connects with the lever, will be thrown down out of gear of the smaller wheels, and thereby stopping the operation of both knives. When the driver removes his foot from the lever the weight of the machine will bring the lever back to its original position, which returns the cog-wheel to its gearing with the smaller ones. This movement of the lever is observed in transporting the machine, and when found necessary to stop the operation of the knives in the process of trimming.

Having thus fully described our invention, what we claim therein as new, and desire to secure by Letters Patent, is—

1. The hinged beam $d$, having the knife-bar attached thereto, as arranged, whereby it may be elevated or depressed by the lever *g* and vertical notched bar *h*, substantially in the manner and for the purpose as herein set forth.

2. The arrangement of the circular saw M and circular bar N in connection with the finger-bars *n*, as arranged, substantially in the manner and for the purpose as herein set forth.

3. The application of a circular plate, M, provided with saw-teeth and suitable fingers *n*, therearound, and operating substantially in the manner described.

4. The combination of the circular plate M with the knife-bar *c*, the one operating simultaneously with the other, substantially in the manner as described.

5. The arrangement of the foot-lever C on the shaft of the driving-wheel B, substantially in the manner and for the purpose as herein described.

6. The arrangement of the driving-wheel B, large cog-wheel D, two smaller ones, G G, large beveled cog-wheel H, and smaller beveled one, I, on crank-shaft J, substantially in the manner and for the purpose as herein set forth.

WILSON SPERRY.
HIRAM SPERRY.

Witnesses:
A. R. NEWTON,
ALBERT G. GRIDLEY.